June 3, 1958      M. S. WOLF      2,837,455
COMPOSITE UPHOLSTERY MATERIAL AND METHOD OF MANUFACTURE
Filed Oct. 11, 1954      2 Sheets-Sheet 1
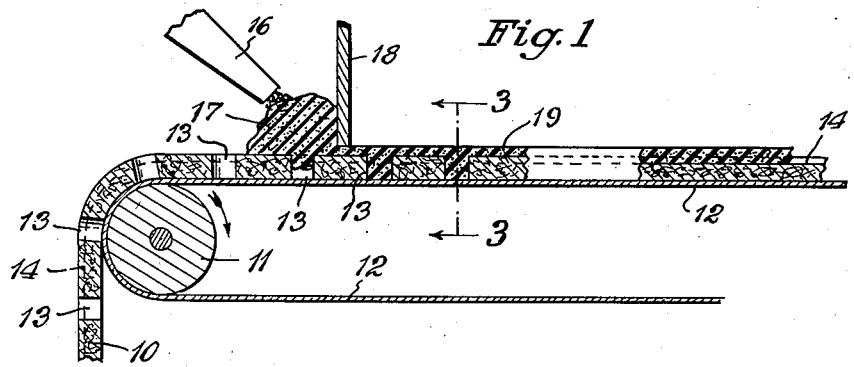
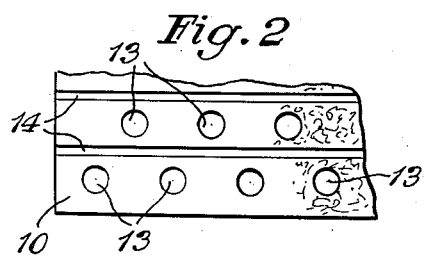
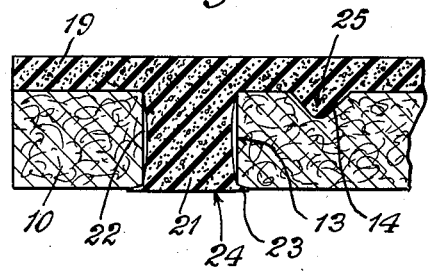
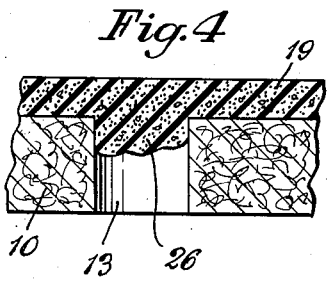
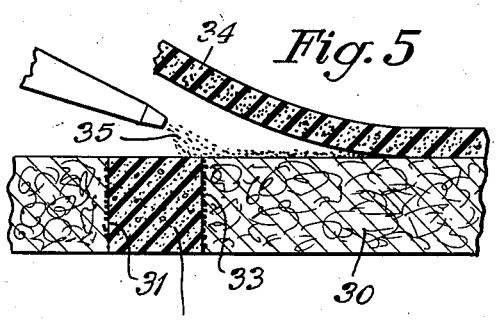
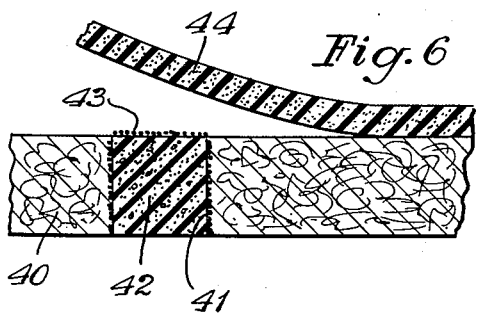
INVENTOR.
Marland S. Wolf
BY W. Bartlett Jones,
Attorney June 3, 1958 M. S. WOLF 2,837,455
COMPOSITE UPHOLSTERY MATERIAL AND METHOD OF MANUFACTURE
Filed Oct. 11, 1954 2 Sheets-Sheet 2

INVENTOR.
Marland S. Wolf
BY
W. Bartlett Jones,
Attorney

United States Patent Office 2,837,455
Patented June 3, 1958

2,837,455

COMPOSITE UPHOLSTERY MATERIAL AND METHOD OF MANUFACTURE

Marland S. Wolf, St. Paul, Minn., assignor to Wood Conversion Company, St. Paul, Minn., a corporation of Delaware Application October 11, 1954, Serial No. 461,554

17 Claims. (Cl. 154—54)

The present invention relates to upholstery material, and in particular to upholstery cushioning combining properties of fiber felts and properties of spongiform elastomer.

The term "spongiform elastomer" as used herein refers to resilient material having the general properties of sponge rubber and foam rubber. These have in common a porous cellular structure of elastic rubber or other elastomer, giving a high degree of resilience and a low resistance to compression. Such material in mass form is used as cushioning material, and these properties are frequently too high in degree for many applications.

On the other hand, fiber felt, or felted fiber, such as hair, cotton, wool, kapok, and many others, is used as padding. As used, it resists compression to a high degree, and hence appears "harder," but it lacks resilience. Upholstery padding consisting of such fibers usually packs down, altering original contours.

It is known to superimpose a layer of spongiform rubber over a mass of fiber padding to secure various combinations of properties. However, in the case of seats, especially automobile seats, there is a tendency for the two layers to slip relative to each other, thus moving fibers and altering the fiber padding.

The present invention has for its object to combine the properties of spongiform elastomer with the properties of fiber felts to a greater degree than has heretofore been attained.

It is a particular object of the invention to minimize the tendency of adjacent layers of fiber padding and of spongiform elastomer to slip at the interface.

It is another object of the invention to produce in sheet form an integral combination of fiber upholstery and of spongiform elastomer.

Various other and ancillary objects and advantages of the invention will become apparent from the following description and explanation of the invention, given in connection with the accompanying drawings, in which:

Fig. 1 is a diagrammatic representation of a process of casting foamed latex on a moving fiber felt.

Fig. 2 is a fragmentary view of the top of the felt in Fig. 1 onto which the foam is cast.

Fig. 3 is an enlarged cross-sectional view taken on the line 3—3 of Fig. 1 considering the foam thereon to have been cured.

Fig. 4 is a view similar to that of Fig. 3 wherein the viscosity of the foamed latex is such that the hole in the felt is not filled.

Fig. 5 is a view showing a modified method and product wherein spongiform plugs fill holes in the felt and a layer of spongiform material is adhesively united to the plugged felt at the region of the plugs and over the face of the felt.

Fig. 6 is a modification of Fig. 5 wherein the adhesion is limited to the spongiform plug and the spongiform layer.

Figure 7:
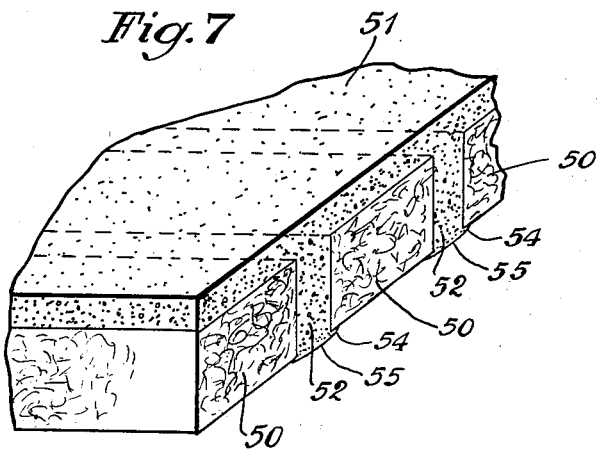
Fig. 7 is a fragmentary perspective view of a modified form of the invention in which the felt layer is composed of spaced strips of felt with spongiform material filling the spaces.

In general, the invention embodies preformed flexible fiber felt available in sheet form, in a variety of thicknesses, and a variety of densities. The fibers may vary in kind or in mixtures of different kinds, and fiber properties per se are reflected in the sheet properties. The fibers are bonded by an adhesive substance, which may be in whole or in part the bond of thermoplastic fibers. The bonding agent also contributes to properties of the sheet.

The preferred fiber sheet for the present invention is a blanket of fibers from wood, especially sulfite fibers, bonded by starch as adhesive. Sheets so made having thickness in the range from ⅛ inch to 2 inches, and dry density in the range from 1.5 to 4.5 pounds per cu. ft. have long been used as upholstery material.

Such products may be made by the method described in U. S. Patents No. 2,646,381, No. 2,624,079, No. 2,569,169, and their predecessor patents. Also where a thermosetting resin is used as binder, the product may be made by the method described in No. 2,610,138. Such materials are herein referred to as "fiber blankets."

The invention involves various structures in which fiber blanket material is adjacent a layer of spongiform elastomer in one direction, and at right angles thereto such materials are to varying degrees side-by-side. Thus, a fiber blanket may have surface indentations or body perforations, over which lies a layer of spongiform elastomer united to bodies of spongiform elastomer located in the indentations or perforations. The preferred method of so combining the materials is to produce the spongiform elastomer layer and bodies in situ.

In Fig. 1, the numeral 10 designates a length of fiber blanket being fed over roll 11 which roll carries a polished steel belt 12. The blanket is provided with holes through to the belt 12 and also surface indentations, the two types being combined primarily to simplify the explanation. In actual practice, using fiber blankets of 0.5- and 1-inch thickness, cylindrical holes of 1- and 2-inch diameters have been formed. The numeral 13 designates such a hole. The numeral 14 represents indentations only. These may be of any size and shape, and are shown as grooves. The indentations may be cut into a dry felt, or they may be impressed in any shape when the mat is moist in manufacture before the binding agent has set.

In Fig. 1, the blanket 10 on the belt 12 moves under and past a nozzle 16 which feeds aqueous latex foam and maintains a mass 17 thereof behind a doctor blade 18. The doctor blade 18 is set to form a layer 19 of predetermined thickness on the blanket 10. The foam contains one or more agents for gelling or gelling and vulcanizing. The gelling agent sets the foam, and then the gel is dried or dried and vulcanized in an oven, all in a well-known manner.

The result is to unite the blanket 10 with a facial layer of spongiform elastomer, which extends integrally into the perforations 13 and indentations 14. However, the viscosity of the mass 17 and the sizes of the openings determine whether or not the openings are completely filled. To fill holes completely, the viscosity of mass 17 is less than where only surface covering is practiced. Lowering viscosity increases the extent to which a body of wet foam shrinks in process.

Fig. 3 illustrates the effect of such shrinkage. The cylindrical hole 13 was originally filled with wet foam, but in process, the column 21 of foam has shrunk in diameter leaving a slight space 22 with the column loose and unbonded to the blanket. The column 21 actually becomes the shank of a rivet-like structure. The wet foam apparently pulls the fiber mat away from the steel belt at the periphery of the hole, by wetting the fibers, which draw together. The resulting space receives foam which in curing leaves a thin flange-like end 23. Numeral 24 indicates a skin formed against the steel belt. Numeral 25 represents a rib of foam in the groove 14.

The tendency to shrink is inherent in forming dry foam elastomer from aqueous foamed latex. The shrinkage described with reference to Fig. 3 is apparent where the hole is two inches in diameter. Whether or not the set foam pulls away from the fiber wall to leave a slight space depends on numerous factors, including the viscosity and aquosity of the foamed latex, the density of the fiber mat, the length of the dimension for shrinkage, and even the bonding of the fibers in the mat. Conditions may readily be selected to effect bonding of the spongiform extensions of the layer to the lateral walls of the mat, whether as holes, recesses or grooves. Where ribs are formed as described, these may be relatively thin and become bonded to the felt walls. Accordingly, where it is herein stated and especially in the claims, that the fiber felt "substantially fills" the spaces between the elastomer bodies extending from the elastomer layer, it is intended to comprehend the bonded structures as well as those in which shrinkage is evident.

Fig. 4 illustrates the result when the mass 17 is too viscous to fill the hole 14. The depending mass 26 shrinks vertically, adheres to the wall of the hole, and terminates short of the bottom of the hole.

Other structures of somewhat similar nature may be made without casting foam onto fiber blanket. For example, in Fig. 5, a fiber blanket 30 has holes 31 formed therethrough into each of which is fitted a corresponding plug 32 of spongiform elastomer. The plugs are preferably cemented to the felt as shown at 33. Then a preformed layer 34 of spongiform elastomer is united to the plugged mat, as by spraying suitable bonding cement 35 for location at the interface.

It is not essential for all purposes of the invention that the elastomer layer be adhesively united to the fiber blanket. In Fig. 6, a fiber blanket 40 has holes 41 in which are cemented spongiform elastomer bodies 42 which carry bonding material 43 at the ends, such as a suitable rubber cement or solvent for one of the elastomers. Then a layer 44 of spongiform elastomer is united to the plugs.

Figure 8:
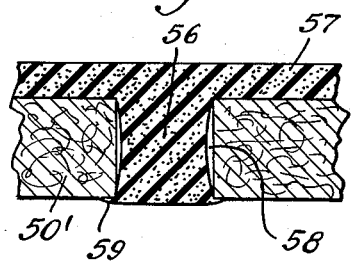
Fig. 8 is a modified form of Fig. 7 in which the space between the felt strips is sufficiently wide to evidence shrinkage of the latex therein.

The desired objectives may be attained by other methods providing structures in modified form. For example, in place of feeding one fiber blanket 10 as in Fig. 1, spaced parallel strips of such material may be fed. The foam will form parallel ribs integral with the surface layer. The product is illustrated in Figs. 7 and 8. The fiber strips 50 have their top faces united to the covering layer 51 of foam, which is integral with vertical ribs 52 of spongiform elastomer. The ribs are sufficiently narrow so that the ribs bind to the fiber walls. The ribs also have retaining flanges 54 at the open faces of the mat strips 50. The skin face is designated at 55. Fig. 8 represents a modified form wherein strips 50' are further apart forming wider ribs 56 extending the layer 57. The ribs shrink from the fiber leaving spaces 58. The bottom skin extends as flanges 59 under the felt.

Figure 9:
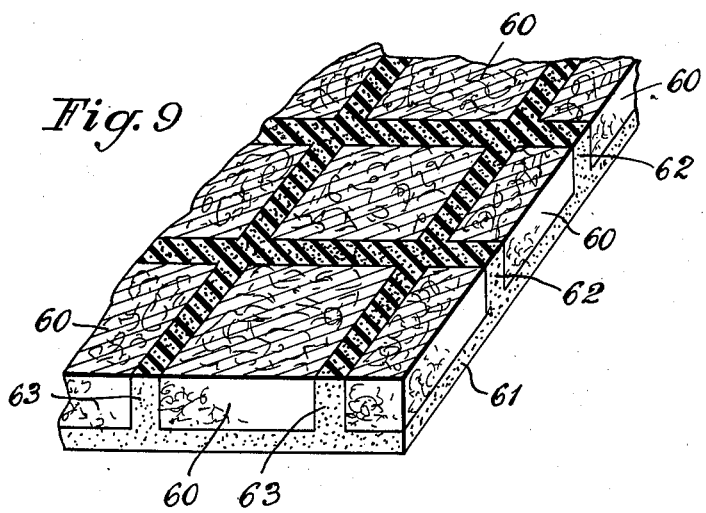
Fig. 9 is a modification of the product of Fig. 7 in which the spaces between the felt portions extend in two right-angular directions.

Fig. 9 shows a product similar to that of Fig. 7 but inverted from the showing of Fig. 7, having spongiform ribs in two directions, right-angles being shown. The showing is in cross-section to avoid illustrating the flanges like the flanges 54 in Fig. 7. In place of feeding strips to a casting apparatus, a pattern of spaced blocks is fed providing bounding ribs for each block. The pattern and the blocks may vary. For convenience in illustration, alined rectangular blocks 60 of fiber blanket are shown. These lead to a spongiform surface layer 61 of foam, and crossing spongiform ribs 62 and 63 integrally united to the surface layer 61.

In actual practice of casting latex on felt, the fiber felt having a density of 2.5 pounds per cu. ft. has varied from 0.5 to 1 inch in thickness, and the dry foam has varied from $\frac{1}{32}$ inch to $\frac{3}{8}$ inch, with holes varying from 1 to 2 inches in diameter. To form a dry foam layer of $\frac{3}{8}$-inch thickness, and to fill the holes, a wet foam layer of $\frac{19}{32}$ inch is cast. The shrinkage in thickness is about $\frac{7}{32}$ inch.

The existence of spongiform extensions of the spongiform surface layer, into the body of the felt, causes the felt to move laterally with the surface layer and thus minimize slippage between the two layers. This effect is greatly enhanced by adhesion at the interface of the spongiform layer and the fiber felt. This adhesion also has another very important function. Fiber felt tends to pack for lack of sufficient resiliency to effect a spring-back. Spongiform material is characterized by spring-back to original position, after released of compression. The projecting resilient bodies within the felt, always function to push the surface layer back to original position. When the surface layer is united to the felt at the interface, its return to original position pulls the less resilient felt back to its original position.

These effects in widely varying degree may be achieved by the varied structures permitted within the scope of the present invention.

Although I have described the casting of foamed latex onto a fiber mat, it is to be understood that other methods of combining the material may be practiced. For example, reference is made to Alderfer U. S. No. 2,628,654, in which the foamed latex is flowed onto a moving belt behind a doctor blade. Down the foam side of the doctor is fed at the same speed as the belt a fabric which defines a fixed space between it and the belt to define the layer of foam thus combined with the fabric. The present invention may be carried out by passing the fiber felt between the doctor and the belt, and piling the foam sufficiently high behind the doctor to fill the holes or recesses or spaces between felt strips, with the fluid foam.

Numerous other modifications are permissible without departing from the spirit and scope of the invention as expressed in the appended claims.

I claim:

1. Sheet material comprising a layer of spongiform elastomer, columnar bodies of spongiform elastomer united to said layer at one face thereof, all of said bodies extending to a substantially parallel plane, and compressible cushioning fiber felt substantially filling the remaining space between said face and plane and terminating in said plane.

2. Sheet material comprising a layer of spongiform elastomer, columnar bodies of spongiform elastomer united to said layer at one face thereof, all of said bodies extending away from said face to a facial boundary of the sheet, and compressible cushioning fiber felt extending from said boundary to said layer and substantially filling the space between said extending bodies, the faces of the fiber felt and of said layer being secured to each other.

3. Sheet material comprising a layer of spongiform elastomer, columnar spongiform elastomer bodies united to said layer at one face thereof, all of said bodies extending away from said face to a facial boundary of the sheet, and compressible cushioning fiber felt extending from said boundary to said layer and substantially filling the space between said extending bodies, the felt and all the spongiform material being secured at their interfaces.

4. Sheet material comprising a layer of spongiform elastomer, integral columnar extensions thereof from a face thereof all terminating in a substantially parallel plane, and compressible cushioning fiber felt substantially filling the remaining space between said face and plane and terminating in said plane, the faces of the fiber felt and of said layer being secured to each other.

5. Sheet material comprising a layer of spongiform elastomer, integral columnar extensions thereof from a face thereof all terminating in a substantially parallel plane, and compressible cushioning fiber felt in the remaining space between said face and plane and terminating in said plane, the felt and all the spongiform material being secured at their interfaces.

6. Cushioning material comprising a layer of compressible cushioning fiber felt having a multiplicity of holes formed therein and therethrough along the thickness dimension, a layer of spongiform elastomer in contact with one face of said felt, and spongiform elastomer bodies filling said holes in the felt and united to said spongiform layer, said bodies having the surfaces of their free ends coextensive with the surface of the felt.

7. Cushioning material comprising a layer of compressible cushioning fiber felt having a multiplicity of holes formed therein and therethrough along the thickness dimension, a layer of spongiform elastomer united to one face of said felt, and spongiform elastomer bodies substantially filling said holes in the felt and united to said spongiform layer, said bodies having the surfaces of their free ends coextensive with the surface of the felt.

8. Cushioning material comprising a layer of compressible cushioning fiber felt having a multiplicity of holes formed therein and therethrough along the thickness dimension, a layer of spongiform elastomer united to one face of said felt, and spongiform elastomer bodies substantially filling said holes in the felt and united to the felt and to the spongiform layer at their interfaces, said bodies having the surfaces of their free ends coextensive with the surface of the felt.

9. Cushioning material comprising a layer of compressible cushioning fiber felt having a multiplicity of holes formed therein and therethrough along the thickness dimension, a layer of spongiform elastomer in contact with one face of said felt, and integral extensions of said layer located in and substantially filling said holes in the felt, said bodies having the surfaces of their free ends coextensive with the surface of the felt.

10. Cushioning material comprising a layer of compressible cushioning fiber felt having a multiplicity of holes formed therein and therethrough along the thickness dimension, a layer of spongiform elastomer united to one face of said felt, and integral extensions of said layer located in and substantially filling said holes in the felt and secured to the felt at their interfaces, said bodies having the surfaces of their free ends coextensive with the surface of the felt.

11. Sheet material comprising a layer of spongiform elastomer and a series of parallel continuous spongiform elastomer ribs united to said layer at one face thereof, and continuous strips of compressible cushioning fiber felt substantially filling all the space between said ribs in flush relation therewith.

12. Sheet material comprising a layer of spongiform elastomer and a series of parallel continuous spongiform elastomer ribs secured to said layer at one face thereof, and continuous strips of compressible cushioning fiber felt substantially filling all the space between said ribs in flush relation therewith, said felt being secured to the said face of said layer.

13. A pad comprising a lower ply formed by a continuous strip of a readily compressible fibrous material having a multiplicity of holes extending therethrough, an upper ply of cured foam rubber having integral portions extending into and filling the holes in said fibrous material, said fibrous material comprising bonded cellulosic fibers.

14. The method which comprises forming from a face of a layer of compressible cushioning of fiber felt along the thickness dimension a multiplicity of recesses and of holes through the felt, forming a layer of an aqueous foam of an elastomer latex over said face of the recessed layer and filling said recesses and said holes with said foam, and gelling, drying and curing said foam.

15. The method which comprises forming from a face of a layer of compressible cushioning fiber felt along the thickness dimension a multiplicity of holes extending through the felt, forming a layer of an aqueous foam of an elastomer latex over said face of the felt and filling said holes from said face with said foam, and gelling, drying and curing said foam.

16. The method which comprises forming from one face of a layer of compressible cushioning fiber felt along the thickness dimension a multiplicity of recesses and of holes through the felt, combining said felt at said face with aqueous foam of an elastomer latex in the form of a layer of foam, filling said recesses and said holes with like foam, and gelling, drying and curing said foam.

17. The method which comprises forming from one face of a layer of compressible cushioning fiber felt along the thickness dimension a multiplicity of holes extending through the felt, combining said felt at said face with aqueous foam of an elastomer latex in the form of a layer of foam, filling said holes with like foam, and gelling, drying and curing said foam.

References Cited in the file of this patent

UNITED STATES PATENTS

| | | |
|---|---|---|
| 1,348,259 | Wilber | Aug. 3, 1920 |
| 2,290,614 | Rathbun | July 21, 1942 |
| 2,622,052 | Chandler | Dec. 16, 1952 |
| 2,688,152 | Marco | Sept. 7, 1954 |

FOREIGN PATENTS

| | | |
|---|---|---|
| 446,300 | Great Britain | Apr. 28, 1936 |
| 476,678 | Great Britain | Dec. 8, 1937 |